United States Patent [19]

Koch

[11] Patent Number: 4,614,086
[45] Date of Patent: Sep. 30, 1986

[54] EXHAUST POWERED DRIVE SHAFT TORQUE ENHANCER

[75] Inventor: Andrew B. Koch, Las Vegas, Nev.

[73] Assignee: Energy Modifications Enterprises, Inc., Las Vegas, Nev.

[21] Appl. No.: 666,205

[22] Filed: Oct. 29, 1984

[51] Int. Cl.[4] .......................... F02G 3/00; F02B 37/00
[52] U.S. Cl. ........................................ 60/624; 60/602
[58] Field of Search ................. 60/624, 600, 601, 602, 60/603

[56] References Cited

U.S. PATENT DOCUMENTS

| | | | |
|---|---|---|---|
| 1,332,427 | 3/1920 | Cooper | 60/624 |
| 3,090,194 | 5/1963 | Glamann | 60/624 |
| 3,242,665 | 3/1966 | Flater | 60/624 |

FOREIGN PATENT DOCUMENTS

| | | | |
|---|---|---|---|
| 2820941 | 11/1978 | Fed. Rep. of Germany | 60/602 |
| 1037700 | 5/1953 | France | 60/602 |
| 924760 | 5/1963 | United Kingdom | 60/602 |

Primary Examiner—Douglas Hart
Attorney, Agent, or Firm—A. Ray Osburn

[57] ABSTRACT

A drive shaft torque enhancer for internal combustion engines acting through drive shafts, including engine exhaust gas ducting directing the exhaust to impinge upon blades secured radially outstanding from the drive shaft, to impart torque thereto, said enhancer preferably including a housing about the exhaust impingement blades. The torque enhancer is equally applicable to power systems of moving vehicles and stationary power applications. For vehicles, provisions are made for diverting the exhaust gases into the engine's regular exhaust system, triggered by the action of the operator's foot upon the vehicle brake pedal.

12 Claims, 9 Drawing Figures

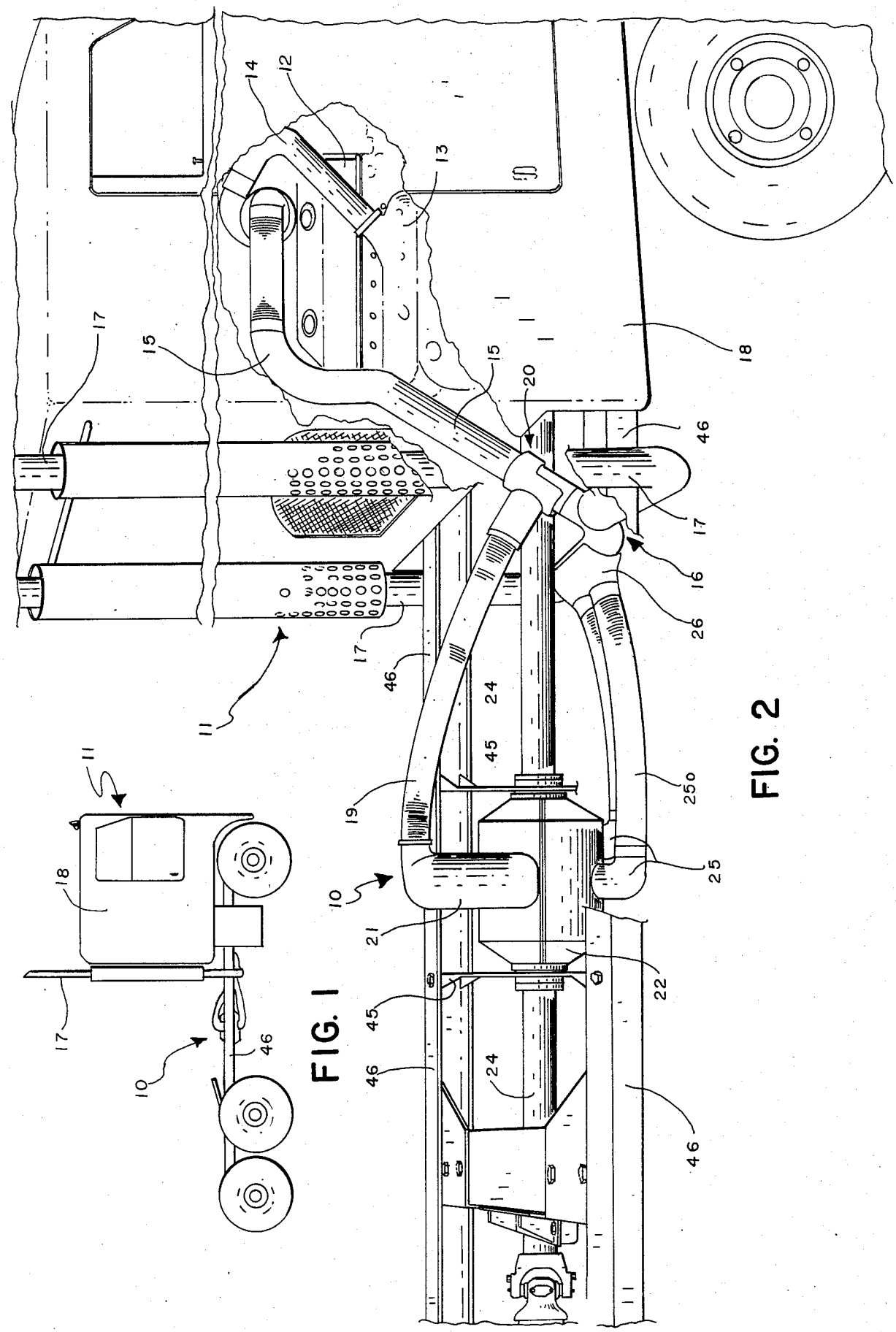

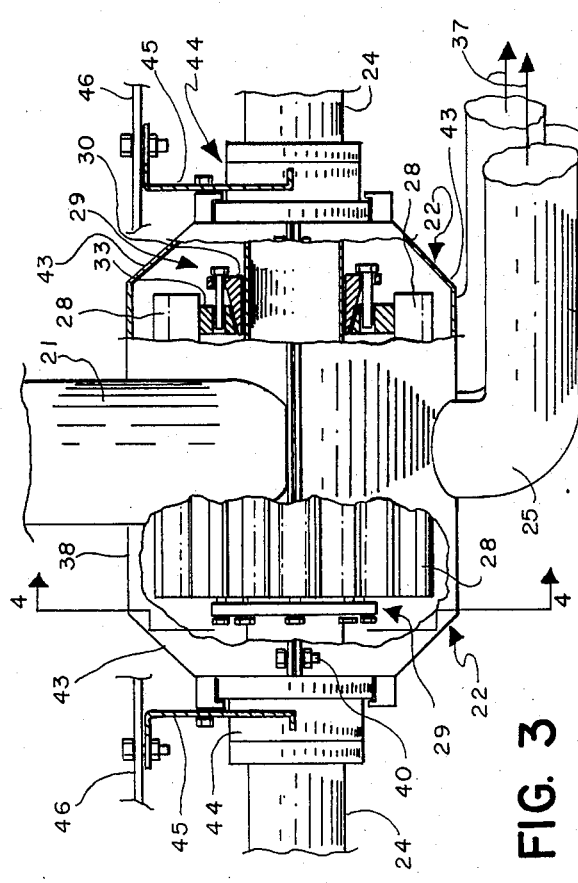

EXHAUST POWERED DRIVE SHAFT TORQUE ENHANCER

BACKGROUND OF THE INVENTION

1. Field: The field of the invention is devices and methods to improve the efficiency of vehicles powered by internal combustion by utilizing energy from the exhaust gases of the engines, and more particularly such devices and methods which enhance the torque applied to the drive shafts of the vehicle by the engines.

2. State of the Art: Increased thermal efficiency of internal combustion engines has been the object of much inventive effort, and recovery of the otherwise wasted energy in the hot exhaust gases has been attempted with some success. The exhaust gases have been used to preheat the fuel before combustion in the engine, to recover some of the thermal energy contained in the hot exhaust gases. The exhaust gases have been used to operate turbines to power superchargers for precompressing the engine intake air. Another approach has utilized the elevated temperatures of the exhaust gases to preheat engine intake air. Preheating of the fuel is inherently dangerous, and only a small portion of the thermal energy in the exhaust gases can be safely used in this manner. The exhaust-powered supercharger systems involve inefficient turbines. Using preheated air is also dangerous, and leads to carburetion problems associated with the heat-expanded air. Thus, effective, safe utilization of the energy in exhaust gases of internal combustion engines has heretofore eluded engine and vehicle designers.

BRIEF SUMMARY OF THE INVENTION

With the foregoing in mind, the disadvantages in the prior art methods and devices for utilizing the energy in the exhaust gases of internal combustion engines are eliminated or substantially alleviated in the present invention, which utilizes exhaust gas kinetic energy to provide increments of torque to the drive shaft, over the torque provided directly by the crank shaft of the engine. In accordance with the invention, elongate blades are mounted along and radially outstanding from an accessible section of the drive shaft. The exhaust gases are diverted from the exhaust discharge duct system of the engine to impact upon the blades to produce the additional torque. In a preferred embodiment, a two-position shunt gate valve is provided in the main exhaust duct from the engine, and, when positioned for torque enhancer use, prevents the exhaust gas stream from entering the engine exhaust pipes, and directs it into a feed duct to the torque enhancer. To preclude difficulty in vehicle applications, the shunt valve is preferably rigged to automatically go to a position stopping flow to the enhancer, and restoring conventional flow of the exhaust gases, when the operator's foot is applied to the vehicle brake pedal. The invention preferably includes a housing about the blades, having an engine exhaust gas inlet and outlet, to collect the spent exhaust gases and direct them back to the engine exhaust system for discharge into the atmosphere. The exhaust gas inlet to the torque enhancer may be advantageously provided with adjustable baffle means, so that the entering exhaust gases may be directed to impinge upon a greater or lesser portion of the blades, as may be required by differing vehicle operating conditions such as level or steep grade travel.

BRIEF DESCRIPTION OF THE DRAWINGS

In the drawings, which represent the best mode presently contemplated for carrying out the invention:

FIG. 1 is a side elevation view of a truck tractor represented with a drive shaft torque enhancer installed thereon, FIG. 2 an upper side perspective view of fragments of the truck tractor of FIG. 1, cut away to show the torque enhancer and associated exhaust and enhancer ducting, drawn to a larger scale than FIG. 1, FIG. 3 a side elevation view of a fragment of the drive shaft of the truck tractor of FIG. 2 showing the torque enhancer installed thereon, the external housing of said enhancer being cut away to show portions of the exhaust impingement blades and the hub assembly to which said blades are attached, and another portion of said housing being cut away and one of the hubs being shown in vertical section, showing also brackets mounting said housing upon the vehicle frame, being drawn to a somewhat larger scale than that of FIG. 2, FIG. 4 a vertical cross sectional view taken along line 4—4 of FIG. 3, drawn to the same scale, FIG. 5 a schematic representation of a portion of the torque enhancer and associated ducting, showing also the control system therefor, FIG. 6 an enlarged view of a fragment of the cross sectional view of FIG. 3, showing the construction of one of the hubs securing the exhaust impingement blades to the drive shaft of the vehicle, FIG. 7 a cross sectional view of the junction between the engine exhaust duct and the torque enhancer feed duct, showing fragments of each and also the two position gate valve controlling the flow from the engine exhaust duct, drawn to a somewhat larger scale than FIGS. 3 and 4, FIG. 8 a cross sectional view of the inlet to the torque enhancer housing, taken along line 8—8 of FIG. 2, showing the exhaust stream directing baffle in solid and dashed example positions, drawn to the scale of FIG. 7, and FIG. 9 a cross sectional view of the enhancer inlet of FIG. 8 showing also a fragment of the enhancer housing attached thereto, and a fragment of the impingement blade assembly, drawn to the scale of FIG. 8.

DETAILED DESCRIPTION OF ILLUSTRATED EMBODIMENTS

Figure 8:
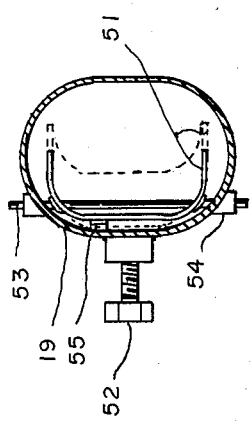
Figure 9:
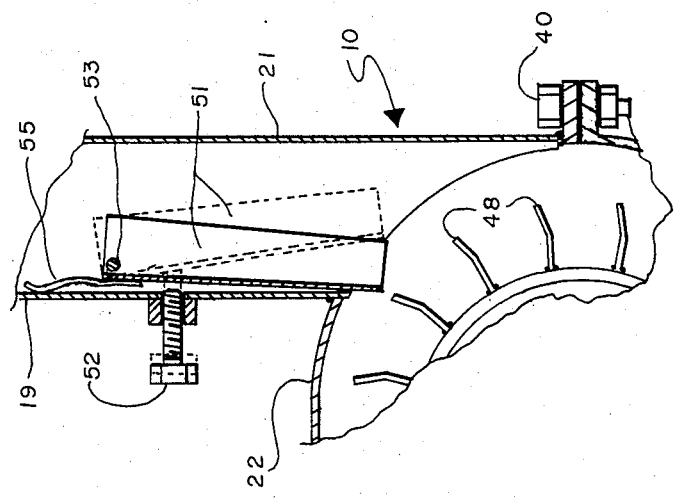

A drive shaft torque enhancer 10 in accordance with the invention is in the illustrated example installed upon the drive shaft of a truck tractor 11. The exhaust gases produced by operation of engine 12 exists by way of an exhaust gas collector 13, then through a primary exhaust pipe 14 into an enlarged engine exhaust duct 15, to a "Y" junction 16, and finally to twin vertical exhaust stacks 17, near the corners of drive cab 18. (FIGS. 1 & 2) The drive shaft torque enhancer 10 is adaptable to vehicles having other exhaust arrangements, such as a single exhaust stack or horizontal exhaust exist pipes (automobles, e.g.). Further, enhancer 10 is applicable to all power-producing combinations including internal engines with drive shafts, whether in vehicles or stationary setups, including for example those for generating electricity.

Exhaust duct 15, "Y" junction 16, and exhaust stacks 17 are existing components of the exhaust gas discharge system of tractor 11. Torque enhancer feed duct 19, perferably of flexible steel duct construction, connects with duct 15 at a junction 20, to transport the exhaust gases from duct 15 to inlet 21 to torque enhancer 10 in enhancer housing 22. At junction 20, a two-position rotating gate valve assembly 23 is provided, which is used to block the flow of exhaust gases into "Y" 16, and to direct the gases into the torque enhancer feed duct 19. The exhaust gases then pass through torque enhancer 10, imparting torque to vehicle drive shaft 24 as hereinafter described. A pair of enhancer outlets 25 join with a pair of outlet ducts 25o, which join the existing vehicle exhaust system at "U" shaped junction 26 with one of the legs downstream of "Y" junction 16. From junction 26, exhaust gases proceed to the amosphere through exhaust duct stacks 17. Outlet ducts 25o are selected so that their combined flow area is substantially in excess of the area of inlet duct 19.

Torque enhancer 10 comprises exhaust impingement blades 28, each secured at each end, as by welds 27, to a pair of spaced apart hub assemblies 29. Blades 28 extend radially from hubs 29, and are euqally spaced therearound. When hub assemblies 29 are secured to the outside periphery of drive shaft 24, blades 28 extend in a direction radial to drive shaft 24. (FIGS. 3, 4, 6 and 9) Each hub 29 has a drive shaft gripping collar 30 carrying a conically tapered male portion 31 joining with a female conical portion 32 in a compression collar 33, to which the blades 28 are welded. Bolts 34, symmetrically distributed about gripping collar 33, act through unthreaded bores 35 to engage threaded bores 36 in blade carrying compression collar 33. Tightening bolts 34 cause female tapered portion 32 of compression collar 30 to elastically compress collar 30 inwardly to grip the outside surface of drive shaft 24. Drive shaft 24 is preserved in full strength, undeteriorated by welding or other potentially harmful fastening means. (FIGS. 3, 4 and 6)

Blades 28 are enclosed within housing 22, which may be of sheet metal or other lightweight construction. Exahust gas stream 37 enters housing 22 from feed duct 19 through housing inlet 21, and impinges upon blades 28 to create torque upon drive shaft 24. The spent gases then pass from housing 22 through enhancer outlet 25 and outlet ducts 25o, as previously described.

Enhancer housing 22 is preferably constructed in upper and lower halves 38 and 39 respectively, to facilitate its installation and removal. Halves 38 and 39 are joined by housing bolts 40 connecting upper and lower flanges 41 and 42 respectively. Concial ends 43 each connect to a shaft bearing 44, allowing drive shaft 24 to rotate during operation of the vheicle, while housing 22 remains stationary. Brackets 45 secure upper housing 38 to stationary vehicle frame 46. Shaft bearings 44, preferably self-lubricating, are preferably constructed in two halves. The separate lower halves of the housing and bearings permit easy removal for inspection and the like.

Housing 22 is preferably not symmetrical about drive shaft 24, but is bulged outwardly at the exhaust gas inlet side, to provide a relatively unimpeded path for exhaust gases 37 to flow through torque enhancer 10, without producing back pressure into the exhaust system of the vehicle 11. Such back pressure would adversely affect engine operation. Clearance 47, between blade tips 48 and the wall 49 at the inlet side of housing 22, is substantially larger than the narrower clearance 50 at the opposite side of housing 22, and is preferably of greater total area than that of inlet duct 19.

Tips 48 of blades 28 are shaped for optimum torque producing performance. In some instances, curved, cupped, or straight tips, for example, may prove superior to the illustrated angled planar configuration. Similarly, the number of blades 28 may be selected for best torque efficiency.

Since different vehicles must operate under different terrain conditions, it is advantageous that torque enhancer 10 be easily adjustable to various vehicle operating conditions. For example, a vehicle operating on level highways at steady, high speeds at high gear ratios might well permit more complete engagment of blades 28 by the exhaust gas stream 37 than would operation on steep grades at low gear ratios and low speed. The slower drive shaft rotation relative to engine rpm would in the latter instance tend to more markedly impede the exhaust gases to produce back pressure. Accordingly, adjustable baffle 51 is incorporated into housing inlet 21. (FIGS. 8 and 9) When more area of blade impingement is desired, baffle 51 is adjusted to direct exhaust stream 37 over a greater radial portion of blades 28. (Solid lines, FIGS. 8 and 9 ) Oppositely, baffle 51 may be adjusted for impingement of smaller portions of blades 28. (Dashed lines) Baffle adjusting bolt 52 pivots baffle 51 about pin 53 for the desired amount of deflection of exhaust stream 37. Pin 53 is secured within bosses.54 provided on enhancer inlet 21. Reed spring 55 stabilizes baffle 51 in the selected position.

Figure 7:
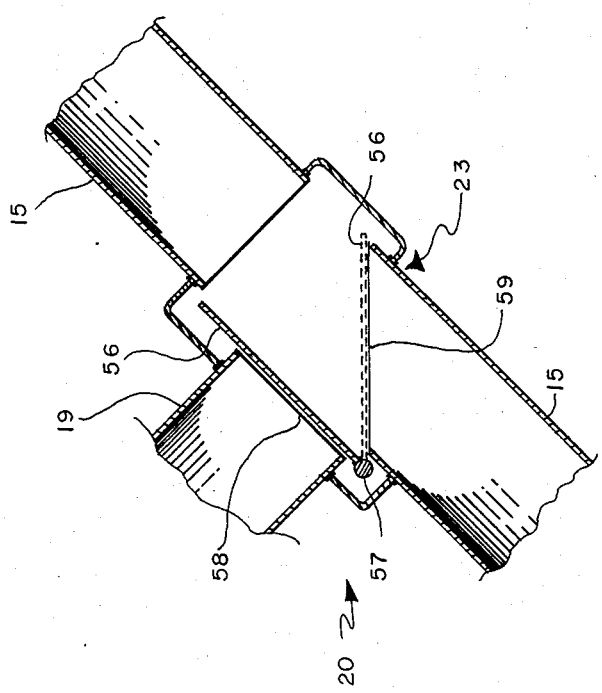

As previously discussed, exhaust gas stream 37 from engine 12 flows through exhaust discharge stacks 17 to the atmosphere when torque enhancer 10 is not in use. The two-position shunt gate assembly 23 provided at junction 20 has a pivoted gate member 56 to divert stream 37 into feed duct 19 to operate torque enhancer 10. (FIG.7 ) Gate member 56, mounted upon gate pivot pin 57, rests against the end 58 of torque enhancer inlet duct 19, when torque enhancer 10 is not in use. To bring torque enhancer 10 into play, gate 56 is rotated about pin 57 to rest against skewed end 59 of main exhaust duct 15, diverting exhaust stream 37 from entering "Y" junction 16, and directing it instead into enhancer inlet feed duct 19.

The vehicle operator engages and disengages torque enhancer 10 by positioning gate 56, using conventional actuation means, which may incorporate mechanical linkages and pneumatic or electrical power sources. However, when vehicle 11 is braked, torque enhancer 10 must, for obvious reasons, be immediately disengaged. Accordingly, the vehicle brake pedal is connected to trigger conventional power means provided for positioning gate 56 to close enhancer inlet duct 19. Separate air cylinders or electrical motor power units may be employed. For vehicles having air brakes, the associated air cylinders may be modified to provide the gate positioning power. One example of a torque enhancer control system is shown schematically in FIG. 5 , in which gate member 56 is loaded by a spring 60 by way gate lever 60L to block enhancer feed duct 19. An air cylinder 61, with a ram 62, overcomes spring 60 to open feed duct 19, thus activating torque enhancer 10. Air cylinder 61 is supplied with compressed air from air tank 63 through air conduit 64, branch 65 of which provides air also to the trailer brakes. Enhancer control valve and pressure regulator 66 is manually actuated to provide compressed air at desired pressure to cylinder 61. A pressure release air bleed valve 67 is arranged to be actuated by brake pedal 68. When air bleed valve 67 is opened, it quickly exhausts the compressed air from air conduits 64 and 65 and air cylinder 61, simultaneously braking the vehicle and releasing gate 56 to be rotated by spring 60 to close duct 19, disengaging torque enhancer 10.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes which come within the meaning and range of equivalency of the claims are therefor intended to be embraced therein.

What is claimed and desired to be secured by United States Letters Patent is:

1. In a power producing combination including an internal combustion engine and a mounting frame therefor, and power transmission means including rotating drive shaft means connected to the engine, the improvement being a drive shaft torque enhancing device, said device comprising:
a multiplicity of blades secured to the drive shaft, equally spaced therearound, each generally lying in a plane containing the axis of the drive shaft;
torque enhancer feed duct means for selectively directing a stream of exhaust gases from the engine to impact against the blades to impart torque to the drive shaft; and wherein
the power producing combination is used in a vehicle, said vehicle having braking means including a brake pedal;
said power producing combination further comprising torque enhancer disengagement means responsive to motion of the brake pedal, means for adjusting the stream of exhaust gases from the feed duct for efficient torque producing impingement thereof upon the blades, a torque enhancer housing to enclose the blades, adapted for attachment to the frame, and having an exhaust gas inlet connected with the torque enhancer feed duct means and positioned to direct the exhaust gas stream upon the blades, an exhaust gas outlet, and outlet duct means connected to the exhaust gas outlet, wherein the exhaust gas stream adjusting means comprises a baffle pivotally mounted within the exhaust gas inlet and an externally operable set screw for adjusting the pivoted position of the baffle to deflect the exhaust gas stream away from the drive shaft the desired amount from full impingement upon the blades, the torque enhancer feed duct means being junctioned with the engine exhaust gas ducting means, and further comprising a two-position valve at said junction for selectively directing the exhaust gases from the engine to the atmosphere or to the torque enhancer feed duct; wherein the brake pedal responsive means comprises;
spring means urging the two-position valve to the position directing the exhaust gases to the atmosphere;
air cylinder and ram means for forcing the two-position valve against the spring to the position directing the exhaust gases into the torque enhancer feed duct;
a compressed air storage tank;
compressed air conduit means connecting the air tank with the air cylinder;
manual valve means in the air conduit for controlling the flow of air to the air cylinder;
bleed valve means in the air conduit, adapted to release the compressed air from the conduit and the air cylinder; and
means automatically actuating the bleed valve means when the operator brakes the vehicle by use of the vehicle brake pedal.

2. The torque enhancing device of claim 1, wherein:
a vehicle is equipped with pneumatic brakes, so that the compressed air storage tank and the pressure relief valve are provided as part of said brake system;
the compressed air conduit to the air cylinder is a branch provided upon the air conduit to the vehicle air brakes; and
the manual control valve is located in the branch conduit to the air cylinder.

3. The torque enhancing device of claim 1, further comprising:
a pair of hub assemblies, each adapted to be secured to and about the drive shaft; and wherein
each blade is secured to each of said hub assemblies.

4. The torque enhancing device of claim 3, further comprising:
a radially outermost compression collar, with a radially innermost conically tapered female bore therethrough, and having threaded longitudinal bolt bores equally spaced therearound;
a drive shaft gripping collar having an innermost circular bore centrally therethrough sized to closely fit about the drive shaft, a circular flange at one of its ends having unthreaded longitudinal bolt bores spaced to match the threaded bores of the compression collar, and a male portion integral with the flange and projecting longitudinally therefrom and being tapered to match the taper of the female bore; and
a bolt installed within each unthreaded bolt bore of the shaft gripping collar and engaging the threads of the matching threaded bolt bore of the compression collar.

5. In a power producing combination including an internal combustion engine and a mounting frame therefor, and power transmission means including rotating drive shaft means connected to the engine, the improvement being a drive shaft torque enhancing device, said device comprising:
a multiplicity of blades secured to the drive shaft, equally spaced therearound, each generally lying in a plane containing the axis of the drive shaft;
torque enhancer feed duct means for selectively directing a stream of exhaust gases from the engine to impact against the blades to impart torque to the drive shaft;
a pair of hub assemblies, each adapted to be secured to and about the drive shaft; and wherein
each blade is secured to each of said hub assemblies.

6. The torque enhancing device of claim 5, wherein each hub comprises:
a radially outermost compression collar, with a radially innermost conically tapered female bore therethrough, and having threaded longitudinal bolt bores equally spaced therearound;
a drive shaft gripping collar having an innermost circular bore centrally therethrough sized to closely fit about the drive shaft, a circular flange at one of its ends having unthreaded longitudinal bolt bores spaced to match the threaded bores of the compression collar, and a male portion integral with the flange and projecting longitudinally therefrom and being tapered to match the taper of the female bore; and a bolt installed within each unthreaded bolt bore of the shaft gripping collar and engaging the threads of the matching threaded bolt bore of the compression collar.

7. In a power producing combination including an internal combustion engine and a mounting frame therefor, and power transmission means including rotating drive shaft means connected to the engine, the improvement being a drive shaft torque enhancing device, said device comprising:

a multiplicity of blades secured to the drive shaft, equally spaced therearound, each generally lying in a plane containing the axis of the drive shaft;

torque enhancer feed duct means for selectively directing a stream of exhaust gases from the engine to impact against the blades to impart torque to the drive shaft;

a torque enhancer housing to enclose the blades, adapted for mounting fo the frame, and having an exhaust gas inlet adapted for connection with the torque enhancer feed duct means, said gas inlet being positioned to direct the exhaust gas stream upon the blades, and exhaust gas outlet;

torque enhancer outlet duct means adapted for connection with said exhaust gas outlet;

a pair of hub assemblies, each adapted to be secured to and about the drive shaft; and wherein each blade is secured to each of said hub assemblies.

8. The torque enhancing device of claim 7, further comprising:

a radially outermost compression collar, with a radially innermost conically tapered female bore therethrough, and having threaded longitudinal bolt bores equally spaced therearound;

a drive shaft gripping collar having an innermost circular bore centrally therethrough sized to closely fit about the drive shaft, a circular flange at one of its ends having unthreaded longitudinal bolt bores spaced to match the threaded bores of the compression collar, and a male portion integral with the flange and projecting longitudinally therefrom and being tapered to match the taper of the female bore; and a bolt installed within each unthreaded bolt bore of the shaft gripping collar and engaging the threads of the matching threaded bolt bore of the compression collar.

9. In a power producing combination including an internal combustion engine and a mounting frame therefor, and power transmission means including rotating drive shaft means connected to the engine, the improvement being a drive shaft torque enhancing device, said device comprising:

a multiplicity of blades secured to the drive shaft, equally spaced therearound, each generally lying in a plane containing the axis of the drive shaft;

torque enhancer feed duct means for selectively directing a stream of exhaust gases from the engine to impact against the blades to impart torque to the drive shaft; wherein the power producing combination is used in a vehicle, and said vehicle has braking means including a brake pedal, said device further comprises;

torque enhancer disengagement means responsive to motion of the brakde pedal of the vehicle;

means for adjusting the stream of exhaust gases from the feed duct for efficient torque producing impingement thereof upon the blades;

a pair of hub assemblies, each adapted to be secured to and about the drive shaft; and wherein each blade is secured to each of said hub assemblies.

10. The torque enhancing device of claim 9 further comprising:

a radially outermost compression collar, with a radially innermost conically tapered female bore therethrough, and having threaded longitudinal bolt bores equally spaced therearound;

a drive shaft gripping collar having an innermost circular bore centrally therethrough sized to closely fit about the drive shaft, a circular flange at one of its ends having unthreaded longitudinal bolt bores spaced to match the threaded bores of the compression collar, and a male portion integral with the flange and projecting longitudinally therefrom and being tapered to match the taper of the female bore; and a bolt installed within each unthreaded bolt bore of the shaft gripping collar and engaging the threads of the matching threaded bolt bore of the compression collar.

11. In a power producing combination including an internal combustion engine and a mounting frame therefor, and power transmission means including rotating drive shaft means connected to the engine, the improvement being a drive shaft torque enhancing device, said device comprising:

a multiplicity of blades secured to the drive shaft, equally spaced therearound, each generally lying in a plane containing the axis of the drive shaft;

torque enhancer feed duct means for selectively directing a stream of exhaust gases from the engine to impact against the blades to impart torque to the drive shaft; wherein the power producing combination is used in a vehicle, and said vehicle has braking means including a brake pedal, and said device further comprises;

torque enhancer disengagement means responsive to motion of the brake pedal of the vehicle;

means for adjusting the stream of exhaust gases from the feed duct for efficient torque producing impingement thereof upon the blades;

a torque enhancer housing to enclose the blades, adapted for mounting to the vehicle frame, said housing having an exhaust gas inlet adapted for connection with the torque enhancer feed duct means, said gas inlet being positioned to direct the exhaust gas stream upon the blades, and an exhaust gas outlet;

torque enhancer outlet duct means adapted for connection with said exhaust gas outlet; wherein the means controlling the direction of flow of the exhaust gases impinging against the blades comprises a baffle member pivotally mounted within the exhaust gas inlet of the enhancer housing, and an externally operable set screw for adjusting the pivoted position of the baffle to deflect the exhaust gas stream away from the drive shaft the desired amount from full inpingement upon the blades;

a pair of hub assemblies, each adapted to be secured to and about the drive shaft; and wherein each blade is secured to each of said hub assemblies.

12. The torque enhancing device of claim 11, further comprising:

a radially outermost compression collar, with a radially innermost conically tapered female bore therethrough, and having threaded longitudinal bolt bores equally spaced therearound;

a drive shaft gripping collar having an innermost circular bore centrally therethrough sized to closely fit about the drive shaft, a circular flange at one of its ends having unthreaded longitudinal bolt bores spaced to match the threaded bores of the compression collar, and a male portion integral with the flange and projecting longitudinally therefrom and being tapered to match the taper of the female bore; and a bolt installed within each unthreaded bolt bore of the shaft gripping collar and engaging the threads of the matching threaded bolt bore of the compression collar.

* * * * *